(12) United States Patent
Kamiyoshi et al.

(10) Patent No.: US 7,811,739 B2
(45) Date of Patent: Oct. 12, 2010

(54) PROCESS FOR PRODUCING A RESIN EMULSION AND TONER

(75) Inventors: Nobumichi Kamiyoshi, Wakayama (JP); Shinichi Sata, Wakayama (JP); Yoshinobu Ishikawa, Wakayama (JP)

(73) Assignee: KAO Corporation, Tokyo (JP)

( * ) Notice: Subject to any disclaimer, the term of this patent is extended or adjusted under 35 U.S.C. 154(b) by 1023 days.

(21) Appl. No.: 11/548,463

(22) Filed: Oct. 11, 2006

(65) Prior Publication Data

US 2007/0088119 A1 Apr. 19, 2007

(30) Foreign Application Priority Data

Oct. 14, 2005 (JP) .............................. 2005-299659

(51) Int. Cl.
*G03G 9/08* (2006.01)
(52) U.S. Cl. .................. 430/137.14; 524/599; 524/801; 523/335; 523/333
(58) Field of Classification Search ............ 430/137.14, 430/137.1; 523/333, 334, 335; 524/599, 524/801
See application file for complete search history.

(56) References Cited

U.S. PATENT DOCUMENTS 5,843,614 A 12/1998 Shinzo et al.

FOREIGN PATENT DOCUMENTS

| JP | 9-311502 | 12/1997 |
| JP | 2000347455 A * | 12/2000 |
| JP | 2002-351140 | 12/2002 |
| JP | 2004225028 A * | 8/2004 |

OTHER PUBLICATIONS

English language translation of JP 2000-347455 (Dec. 2000).*
English langauge translation of JP 2004-225028 (Aug. 2004).*

* cited by examiner

*Primary Examiner*—Christopher RoDee
(74) *Attorney, Agent, or Firm*—Oblon, Spivak, McClelland, Maier & Neustadt, L.L.P.

(57) ABSTRACT

The present invention relates to a process for producing a resin emulsion which includes the steps of (a) dispersing a resin containing acidic group in a basic aqueous medium at a temperature lower than a softening point of the resin; (b) neutralizing a dispersion obtained in the step (a) at a temperature not lower than a glass transition point of the resin and not higher than the softening point of the resin; and (c) adding an aqueous liquid to the dispersion neutralized in the step (b) at the temperature not lower than the glass transition point of the resin and not higher than the softening point of the resin to emulsify the resin in the aqueous medium. According to the present invention, the resin emulsion suitably usable for production of a toner for electrophotography can be efficiently produced without using an organic solvent and a special apparatus.

20 Claims, No Drawings

PROCESS FOR PRODUCING A RESIN EMULSION AND TONER

FIELD OF THE INVENTION

The present invention relates to a process for producing a resin emulsion suitably used for production of a toner for electrophotography which is employed in electrophotography, an electrostatic recording method, an electrostatic printing method or the like.

BACKGROUND OF THE INVENTION

It is conventionally known that chemical prepared toners are produced by a polymerization method or an emulsification dispersion method. Among these methods, when the toner is produced by the emulsification dispersion method, a mixture containing, for example, a resin binder and a colorant is mixed and emulsified in an aqueous medium to obtain toner particles. In this method, for example, upon preparing a polyester emulsion using a polyester as the resin binder, there has been generally used a phase inversion emulsification method using an organic solvent or a forced emulsification method conducted under a high-pressure/high-temperature condition. However, the former method is burdensome for removal and recovery of the organic solvent and waste water treatment, whereas the latter method requires the use of a special apparatus.

As conventional techniques using no organic solvent, there is disclosed, for example, the process for producing a toner for developing an electrostatic latent image which includes the steps of (1) mixing a molten colored resin obtained by heat-melting a kneaded material composed of an ionic group-containing synthetic resin for a toner for developing an electrostatic latent image and a coloring pigment, with an aqueous medium containing a substance capable of neutralizing the ionic group which medium is heated to a temperature not lower than a softening point of the synthetic resin by heating it under pressure; (2) while maintaining the resulting mixture at the temperature not lower than a softening point of the synthetic resin, finely dispersing the molten colored resin in the aqueous medium by a mechanical means; (3) immediately after dispersing, rapidly cooling the obtained dispersion to produce a water dispersion of fine colored resin particles; (4) separating the fine colored resin particles from the dispersion; and (5) drying the thus separated fine colored resin particles (refer to JP 9-311502A).

Further, there is disclosed the process for producing a toner for developing an electrostatic latent image which includes the steps of heat-melting a raw toner material containing at least a polyester resin to produce a melt of the raw toner material; emulsifying the obtained melt in an aqueous medium to form fine resin particles; and then aggregating and further fusing the fine resin particles to produce an associated product of the fine resin particles (refer to JP 2002-351140A).

However, in any of the conventional techniques disclosed in these patent documents, the resin is heated to a temperature not lower than a softening point thereof to form a melt, and the obtained melt is emulsified and dispersed using a special apparatus such as a high-speed rotating continuous type emulsifying and dispersing device.

SUMMARY OF THE INVENTION

Thus, the present invention relates to the following aspects (1) to (3):

(1) A process for producing a resin emulsion, including the steps of:

(a) dispersing a resin containing acidic group in a basic aqueous medium at a temperature lower than a softening point of the resin;

(b) neutralizing a dispersion obtained in the step (a) at a temperature not lower than a glass transition point of the resin and not higher than the softening point of the resin; and (c) adding an aqueous liquid to the dispersion neutralized in the step (b) at the temperature not lower than the glass transition point of the resin and not higher than the softening point of the resin to emulsify the resin in the aqueous medium.

(2) A process for preparing a toner for electrophotography including the steps of: producing a resin emulsion by the process described in the above aspect (1); and aggregating and coalescing emulsified particles contained in the thus produced resin emulsion in the presence of a colorant.

(3) A toner for electrophotography which is produced by aggregating and coalescing emulsified particles contained in the resin emulsion produced by the process described in the above aspect (1).

DETAILED DESCRIPTION OF THE INVENTION

The present invention relates to a process for efficiently producing a resin emulsion suitably employed for producing a toner for electrophotography, without using an organic solvent and a special apparatus, a process for producing a toner for electrophotography which process involves the above process for producing the resin emulsion, and a toner for electrophotography using the above resin emulsion.

The process for producing the resin emulsion according to the present invention includes the above steps (a), (b) and (c). The respective steps (a) to (c) are explained below.

[Step (a)]

In the step (a), a resin containing acidic group is dispersed in a basic aqueous medium at a temperature lower than a softening point of the resin.

The resin containing acidic group may be a known resin usable as a resin binder in a toner (the "resin containing acidic group" is hereinafter occasionally referred to as a "resin binder"). As the resin containing acidic group, there may be used known resins for toners. Examples of the resin containing acidic group include polyesters, styrene-acryl resins, epoxy resins, polycarbonates and polyurethanes. Among these resins, preferred are polyesters and styrene-acryl copolymers, and more preferred are polyesters from the viewpoints of good dispersibility of colorants therein, good fusing ability and good durability. The content of the polyester in the resin binder is preferably 60% by weight or larger, more preferably 70% by weight or larger and even more preferably 80% by weight or larger. In the present invention, these resins may be used as the resin binder alone or in combination of any two or more thereof.

The polyester contained in the resin containing acidic group may be either a crystalline polyester or an amorphous polyester.

The degree of crystallinity of the polyester may be expressed by a crystallinity index defined by a ratio of a softening point to a maximum endothermic peak temperature as measured by a differential scanning colorimeter (softening point/maximum endothermic peak temperature). In general, when the above ratio exceeds 1.5, the resin becomes amorphous, whereas when the ratio is less than 0.6, the resin exhibits a low crystallinity and contains a large amount of an amorphous portion. Therefore, the crystalline polyester preferably has a crystallinity index of 0.6 to 1.5. In view of good low-temperature fusing ability, the crystallinity index of the crystalline polyester is more preferably from 0.8 to 1.3 and even more preferably from 0.9 to 1.1.

The degree of crystallinity of the polyester may be controlled according to the kinds and blending ratios of raw monomers, production conditions (such as, e.g., reaction temperature, reaction time and cooling rate), etc. Here, the maximum endothermic peak temperature means a temperature of such a peak located on a highest temperature side among endothermic peaks observed. When a difference between the maximum endothermic peak temperature and the softening point is within 20° C., the peak temperature is regarded as a melting point, whereas when the difference between the maximum endothermic peak temperature and the softening point exceeds 20° C., the peak is regarded as a peak attributed to a glass transition of the resin. The methods of measuring the softening point and the endothermic maximum peak temperature which define the crystallinity index, are explained in detail below.

As the raw monomers of the polyester, there may be used a known divalent or higher-valent alcohol and a known carboxylic acid component such as a divalent or higher-valent carboxylic acid, and an anhydride and an ester of the carboxylic acid.

Specific examples of the alcohol component include aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, neopentyl glycol and 1,4-butenediol; aromatic diols such as alkyleneoxide adducts of bisphenol A represented by the formula (I):

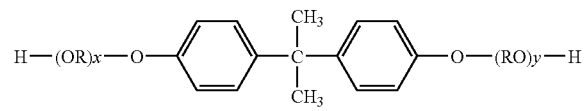

wherein R is an alkylene group having 2 or 3 carbon atoms; and x and y are respectively a positive number with the proviso that a sum of x and y is from 1 to 16 and preferably from 1.5 to 5.0; and trivalent or higher valent polyhydric alcohols such as glycerol and pentaerythritol. Among these alcohol components, in view of promoting crystallization of the polyester, preferred are aliphatic diols having 2 to 8 carbon atoms, more preferred are α,ω-linear alkane diols, and even more preferred are 1,4-butanediol, 1,6-hexanediol, 1,8-octanediol and mixtures thereof. These alcohol components may be used alone or in combination of any two or more thereof.

The content of the aliphatic diol having 2 to 8 carbon atoms in all the alcohol components is preferably from 80 to 100 mol % and more preferably from 90 to 100 mol % from the viewpoint of promoting crystallization of the polyester. In particular, the alcohol components preferably contain 1,4-butanediol, 1,6-hexanediol, 1,8-octanediol or a mixture thereof in an amount of from 80 to 100 mol % and more preferably from 90 to 100 mol % on the basis of the total amount of the alcohol components.

Examples of the carboxylic acid component include aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecyl succinic acid and n-dodecenyl succinic acid; alicyclic dicarboxylic acids such as cyclohexanedicarboxylic acid; aromatic dicarboxylic acids such as phthalic acid, isophthalic acid and terephthalic acid; trivalent or higher-valent polycarboxylic acids such as trimellitic acid and pyromellitic acid; and anhydrides and alkyl ($C_1$ to $C_3$) esters of these acids. These carboxylic acid components may be used alone or in combination of any two or more thereof. In the following descriptions, the above acids, acid anhydrides and acid alkyl esters are collectively referred to as "carboxylic acid compounds".

The resin binder used in the present invention contains an acid group, and the acid group is preferably bonded to a terminal end of a molecule of the resin containing acidic group. Examples of the acid group include a carboxyl group, a sulfonic group, a phosphonic group and a sulfinic group. Among these acid groups, from the viewpoint of satisfying both good emulsifiability of the resin and good environmental resistance of the resulting toner, preferred is a carboxyl group. The amount of the acid group bonded to a terminal end of a molecule of the resin containing acidic group is an important factor for attaining good stability of emulsified particles and determining the particle size distribution and particle size of the resulting toner. The resin binder preferably has an acid value of 10 to 50 mg KOH/g, more preferably 12 to 45 mg KOH/g, even more preferably 15 to 40 mg KOH/g and even more preferably 15 to 30 mg KOH/g in order to stabilize the emulsified particles and obtain a toner having a small particle size and a narrow particle size distribution.

Also, from the viewpoint of rapidly and uniformly dispersing the resin particles, as the resin containing acidic group, there are preferably used resin particles having such a particle size in which 95% by weight or more and more preferably 98% by weight or more of the particles are capable of passing through a sieve according to JIS Z 98801 having an opening diameter of 5.6 mm. The resin particles having such a particle size can be uniformly dispersed and can be evenly neutralized in the next neutralizing step, thereby enabling preparation of homogeneously emulsified particles.

When using the amorphous polyester, the alcohol component used therefor preferably contains the alkyleneoxide adduct of bisphenol A represented by the above formula (I), e.g., the alkylene ($C_1$ to $C_3$) oxide adduct of bisphenol A (average molar number of addition: 1 to 16) such as polyoxypropylene-2,2-bis(4-hydroxyphenyl)propane and polyoxyethylene-2,2 -bis(4-hydroxyphenyl)propane.

The amorphous polyester suitably usable in the present invention preferably satisfies at least one property selected from a softening point of 95 to 160° C., a glass transition point of 50 to 75° C., an acid value of 1 to 40 mg KOH/g and a hydroxyl value of 3 to 60 mg KOH/g.

The number-average molecular weight of the amorphous polyester is preferably from 1,000 to 100,000, more preferably from 1,000 to 50,000 and even more preferably from 1,000 to 12,000 from the viewpoint of good durability and good fusing ability.

The content of the amorphous polyester in the resin binder is preferably 60% by weight or more and more preferably 70% by weight or more from the viewpoint of good durability and good chargeability of the resulting toner.

When the crystalline polyester is used in order to achieve good low-temperature fusing ability, the number-average molecular weight of the crystalline polyester is preferably from 2,000 to 100,000, more preferably from 2,000 to 20,000, even more preferably from 2,000 to 10,000 and even more preferably from 2,000 to 8,000 from the viewpoints of good emulsifiability, good fusing ability and good offset resistance.

The softening point or melting point of the crystalline polyester is preferably from 60 to 150° C., more preferably from 60 to 130° C. and even more preferably from 60 to 120° C. from the viewpoint of good low-temperature fusing ability.

The basic aqueous medium used in the step (a) means an aqueous medium containing a basic compound. The basic compound may be either an inorganic basic compound or an organic basic compound. Examples of the inorganic basic compound include alkali metal hydroxides such as sodium hydroxide, potassium hydroxide and lithium hydroxide, weak acid salts of these hydroxides such as carbonates and acetates or partially neutralized salts thereof, and ammonia. Examples of the organic basic compound include alkyl amines such as methylamine, dimethylamine, trimethylamine, ethylamine, diethylamine and triethylamine, alkanol amines such as diethanol amine, fatty acid salts such as sodium succinate and sodium stearate. These basic compounds may be used alone or in combination of any two or more thereof.

On the other hand, the aqueous medium contains water as a main component. From the viewpoint of environmental protection, the content of water in the aqueous medium is preferably 80% by weight or more, more preferably 90% by weight or more and even more preferably 100% by weight. In the present invention, the resin binder may be dispersed in water solely without using substantially an organic solvent. Examples of components other than water which can be contained in the aqueous medium include water-soluble organic solvents such as methanol, ethanol, isopropanol, butanol, acetone, methyl ethyl ketone and tetrahydrofuran. Among these organic solvents, from the viewpoint of less inclusion into the toner, preferred are alcohol-based organic solvents incapable of dissolving resins therein such as methanol, ethanol, isopropanol and butanol.

The content of the basic compound in the basic aqueous medium may vary depending upon the kind of the basic compound used, and is usually from 1 to 30% by weight, preferably from 3 to 20% by weight and more preferably from 5 to 10% by weight from the viewpoint of preventing hydrolysis of the resin binder.

In the step (a), the basic aqueous medium may be used in an amount of preferably 5 to 100 parts by weight, more preferably 10 to 90 parts by weight and even more preferably 20 to 80 parts by weight on the basis of 100 parts by weight of the resin containing acidic group from the viewpoint of efficiently producing a uniform resin emulsion.

In addition, in the present invention, a surfactant may be added during the dispersion treatment. The amount of the surfactant added is preferably 5% by weight or less, more preferably 0.2 to 5% by weight, even more preferably 0.5 to 4% by weight and even more preferably 1 to 3% by weight on the basis of the weight of the resin from the viewpoint of preventing foaming upon the dispersing step and for the purpose of enhancing the emulsification stability of the finally obtained resin emulsion. Examples of the surfactant include anionic surfactants such as sodium dodecylbenzenesulfonate, sodium octadecyl sulfate, sodium oleate, sodium laurate and potassium stearate; cationic surfactants such as laurylamine acetate, stearylamine acetate and lauryl trimethyl ammonium chloride; amphoteric surfactants such as lauryl dimethylamine oxide; and nonionic surfactants such as polyoxyethylene alkyl ethers, polyoxyethylene alkylphenyl ethers, sorbitan monostearate and polyoxyethylene alkylamines. Among these surfactants, from the viewpoints of a good emulsification stability, etc., preferred are anionic surfactants and nonionic surfactants, and more preferred are anionic surfactants. These surfactants may be used alone or in combination of any two or more thereof.

In the step (a), the colorant together with other optional additives such as a releasing agent and a charge control agent may be added to the resin binder, and the resulting mixture may be dispersed in the aqueous medium.

The colorant is not particularly limited, and may be appropriately selected from known colorants. Specific examples of the colorant include various pigments such as carbon blacks, inorganic composite oxides, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, red iron oxide, Aniline Blue, ultramarine blue, Calco Oil Blue, Methylene Blue Chloride, Phthalocyanine Blue, Phthalocyanine Green and Malachite Green Oxalate; and various dyes such as Acridine dyes, Xanthene dyes, azo dyes, benzoquinone dyes, Azine dyes, anthraquinone dyes, indigo dyes, thioindigo dyes, Phthalocyanine dyes, Aniline Black dyes and thiazole dyes. These colorants may be used alone or in combination of any two or more thereof.

The weight ratio of the resin binder to the colorant is preferably from 70:30 to 97:3 and more preferably from 80:20 to 97:3 from the viewpoints of chargeability, durability and optical density of the resulting toner.

Specific examples of the releasing agent include low-molecular weight polyolefins such as polyethylene, polypropylene and polybutene; silicones exhibiting a softening point upon heating; fatty acid amides such as oleamide, erucamide, ricinolamide and stearamide; vegetable waxes such as carnauba wax, rice wax, candelilla wax, haze wax and jojoba oil; animal waxes such as beeswax; mineral and petroleum waxes such as montan wax, ozokerite, ceresin, paraffin wax, microcrystalline wax and Fischer-Tropsch wax; and the like. These releasing agents may be used alone or in combination of any two or more thereof.

The amount of the releasing agent formulated is usually from about 1 to about 20 parts by weight and preferably from 2 to 15 parts by weight on the basis of 100 parts by weight of a sum of the resin binder and the colorant in consideration of the effects due to addition thereof and the adverse influence on the chargeability.

Examples of the charge control agent include metal salts of benzoic acid, metal salts of salicylic acid, metal salts of alkyl salicylic acid, metal salts of catechol, metal-containing bisazo dyes, tetraphenyl borate derivatives, quaternary ammonium salts and alkyl pyridinium salts. These charge control agents may be used alone or in combination of any two or more thereof.

The amount of the charge control agent formulated is usually 10 parts by weight or less and preferably from 0.01 to 5 parts by weight on the basis of 100 parts by weight of the sum of the resin binder and the colorant.

In the step (a), from the viewpoints of uniformly dispersing the resin particles or a mixture of the resin particles, the colorant and, if required, various additives, the dispersion treatment is suitably conducted at a temperature lower than the softening point of the resin particles. When the resin particles or the mixture is dispersed at a temperature lower than the softening point of the resin particles and preferably at such a temperature which is not higher than a temperature lower by 50° C. than the softening point of the resin particles (hereinafter referred to as a "softening point −(minus) 50° C."), the resin particles can be prevented from being fused together, thereby preparing a uniform resin dispersion. Also, the lower limit of the temperature used for the dispersion treatment is higher than preferably 0° C. and more preferably 10° C. or higher from the viewpoints of good flowability of the medium and saving of energy for production of the resin emulsion. When the resin binder is in the form of a mixture of resins, the softening point of the mixed resin which may be prepared by mixing the respective resins at a predetermined ratio and melting the resulting mixture is regarded as the softening point of the resin binder. In addition, when a master batch is used in the resin binder, the softening point of a mixed resin composed of respective resins including the master batch is regarded as the softening point of the resin binder.

More specifically, particles of the resin containing acidic group such as polyesters are stirred and dispersed together with the colorant, etc., in the basic aqueous medium containing a surfactant at a temperature lower than the softening point of the resin particles, for example, at a temperature of about 10 to 50° C. by an ordinary method, thereby preparing a uniform resin dispersion.

[Step (b)]

In the step (b), the resin dispersion prepared in the step (a) is stirred at a temperature not lower than the glass transition point of the resin but not higher than the softening point thereof for a predetermined period of time to substantially neutralize the resin. From the viewpoint of uniformly neutralizing the resin, the time required for stirring the resin dispersion is preferably 30 min or longer and more preferably one hour or longer.

When the temperature upon stirring the resin dispersion is controlled to the above-specified range, the resin can be neutralized to a sufficient extent, so that formation of too large emulsified particles in the next emulsification treatment is effectively inhibited, and further the heating treatment for the neutralization can be conducted without a special apparatus. From these viewpoints, the neutralizing temperature is preferably a temperature not lower than the glass transition point of the resin +(plus) 10° C. and not higher than the softening point of the resin −(minus) 5° C.

In the neutralizing step, the resin is not necessarily neutralized entirely (100%) and may be neutralized to such an extent as to impart thereto a hydrophilicity required for producing the emulsified particles in the next step. For example, when using a high-hydrophilic resin containing many polar groups, the degree of neutralization of such a resin may be low, whereas when using a low-hydrophilic resin, the degree of neutralization of the resin is preferably high. In the present invention, the degree of neutralization of the resin is preferably 50% or higher, more preferably from 60 to 100% and even more preferably from 70 to 100%. The degree of neutralization is generally expressed by a ratio between numbers of moles of the acid group before and after the neutralization (number of moles of acid group after neutralization/number of moles of acid group before neutralization).

More specifically, the resin dispersion obtained in the step (a) is heated while stirring to a temperature not lower than the glass transition point of the resin and not higher than the softening point thereof, for example, to a temperature of about 90 to 100° C. when using a carboxyl-containing polyester having a glass transition point of about 60 to 65° C. and a softening point of about 110 to 120° C., and then held at that temperature for an adequate period of time until reaching a desired degree of neutralization.

[Step (c)]

In the step (c), an aqueous liquid is added to the dispersion neutralized in the step (b) at a temperature not lower than the glass transition point of the resin and not higher than the softening point thereof to emulsify the resin in the aqueous medium.

In the emulsification step, from the viewpoint of preparing an emulsion containing fine resin particles, the dispersion neutralized in the step (b) is held at a temperature not lower than the glass transition point of the resin and not higher than the softening point thereof, and while stirring the dispersion, the aqueous liquid is added thereto to emulsify the resin in the aqueous medium.

When the resin dispersion is held in the above-specified temperature range, the resin can be smoothly emulsified in the aqueous medium, and the emulsification treatment can be conducted without using a special apparatus. From these viewpoints, the temperature used for the emulsification treatment is a temperature not lower than the glass transition point +(plus) 10° C. and not higher than the softening point −(minus) 5° C.

In the emulsification step, from the viewpoints of facilitated phase inversion, etc., the content of the resin in the dispersion immediately before initiation of the emulsification is preferably from about 50 to about 90% by weight and more preferably from 50 to 80% by weight. Here, the wording "immediately before initiation of the emulsification" means the time at which the viscosity of the system becomes highest during all the steps. Therefore, the time immediately before initiation of the emulsification may be readily determined, for example, by a torque meter fitted to a stirrer.

The emulsification initiation time may be optionally adjusted by controlling the acid value and the degree of neutralization of the resin used. For example, since such a resin having a high acid value or a high degree of neutralization exhibits a high hydrophilicity, the emulsification thereof can be initiated by contacting with a small amount of the aqueous medium.

The aqueous liquid used for the emulsification may be the same as those illustrated for the aqueous medium used in the step (a). The rate of addition of the aqueous liquid is preferably from 0.5 to 50 g/min, more preferably from 0.5 to 30 g/min and even more preferably from 1 to 20 g/min per 100 g of the resin from the viewpoint of effectively conducting the emulsification. The rate of addition of the aqueous liquid may be usually maintained until an O/W type emulsion is substantially formed. Therefore, the rate of addition of the aqueous liquid after forming the O1W type emulsion is not particularly limited.

The solid content of the thus prepared resin emulsion is preferably from 7 to 50% by weight, more preferably from 7 to 45% by weight and even more preferably from 10 to 40% by weight from the viewpoints of good stability of the resulting emulsion and good handling property of the resin emulsion in the subsequent aggregating step.

The volume-median particle size ($D_{50}$) of the emulsified particles obtained after forming the O/W type emulsion is preferably from 0.02 to 2 μm, more preferably from 0.05 to 1 μm and even more preferably from 0.05 to 0.6 μm for the purpose of uniform aggregation thereof in the subsequent aggregating step. Meanwhile, the volume-median particle size ($D_{50}$) used herein means a particle size at which a cumulative volume frequency calculated on the basis of a volume fraction from a smaller particle size side is 50%.

[Process for Producing Toner for Electrophotography]

Next, the emulsified particles in the thus prepared resin emulsion is aggregated in the presence of the colorant (hereinafter referred to as the "aggregating step") and then unified (hereinafter referred to as the "coalescing step"), thereby producing the toner for electrophotography according to the present invention. The colorant may be contained in the resin emulsion, or a dispersion of the colorant may be mixed with the resin emulsion to aggregate and coalesce the particles.

The pH of the system in the aggregating step is preferably from 2 to 10, more preferably from 2 to 9 and even more preferably from 3 to 8 from the viewpoint of satisfying both dispersion stability of the mixed liquid and aggregation property of fine particles of the resin binder, the colorant, etc.

From the same viewpoint, the temperature of the system in the aggregating step is preferably equal to or higher than the temperature calculated from the softening point of the resin binder –(minus) 50° C. (which means the temperature lower by 50° C. than the softening point, or higher; this definition is similarly applied to the subsequent descriptions) and equal to or lower than the temperature calculated from the softening point –(minus) 10° C., and more preferably equal to or higher than the temperature calculated from the softening point of the resin binder –(minus) 30° C. and equal to or lower than the temperature calculated from the softening point –(minus) 10° C.

In the aggregating step, in order to effectively carry out the aggregation, an aggregating agent is preferably added to the resin emulsion. Examples of the aggregating agent include organic aggregating agents such as cationic surfactants in the form of a quaternary salt and polyethyleneimine; and inorganic aggregating agents such as inorganic metal salts and divalent or higher-valent metal complexes. The inorganic metal salts include, for example, metal salts such as sodium sulfate, sodium chloride, calcium chloride, calcium nitrate, barium chloride, magnesium chloride, zinc chloride, aluminum chloride and aluminum sulfate; and inorganic metal salt polymers such as poly(aluminum chloride), poly(aluminum hydroxide) and poly(calcium sulfide). Among them, trivalent aluminum salts and their polymers are preferable because these aggregating agents have a high aggregation capability with a small amount and can be conveniently prepared. In addition, the metal complexes and the cationic surfactants in the form of a quaternary salt are more preferable from the viewpoint of controlling the charging properties. These surfactants may be used alone or in combination of any two or more thereof.

The amount of the aggregating agent is preferably 30 parts by weight or less, more preferably from 0.01 to 20 parts by weight and even more preferably from 0.1 to 10 parts by weight on the basis of 100 parts by weight of the resin binder from the viewpoints of good aggregating capability and good environmental resistance of the resulting toner.

It is preferable that the aggregating agent is added in the form of an aqueous solution, and the mixture is sufficiently stirred during and after addition of the aggregating agent. The thus obtained aggregated particles are then subjected to the step for coalescing the aggregated particles (coalescing step).

The temperature of the system in the coalescing step is preferably equal to or higher than the temperature of the system in the aggregating step. The temperature used in the coalescing step is preferably equal to or higher than the temperature calculated from the softening point of the resin binder –(minus) 50° C. and equal to or lower than the temperature calculated from the softening point of the resin binder +(plus) 10° C., more preferably equal to or higher than the temperature calculated from the softening point of the resin binder –(minus) 40° C. and equal to or lower than the temperature calculated from the softening point +(plus) 10° C., and even more preferably equal to or higher than the temperature calculated from the softening point of the resin binder –(minus) 30° C. and equal to or lower than the temperature calculated from the softening point of the resin binder +(plus) 10° C. from the viewpoint of controlling particle size, particle size distribution and shape of the toner as desired, and fusibility of the aggregate particles. In addition, it is preferable that the stirring rate is a rate at which the aggregate particles are not precipitated.

The coalescing step can be carried out simultaneously with the aggregating step, for example, by continuously raising the temperature of the system, or by heating the system to a temperature at which the particles can be both aggregated and unified, and then continuously stirring the particles at that temperature.

The resulting unified particles may be appropriately subjected, if required, to a liquid-solid separation step such as filtration, a washing step, a drying step, etc., whereby toner mother particles can be obtained.

In the washing step, it is preferable that an acid is used for removing metal ions on the surface of the respective toner mother particles in order to ensure sufficient chargeability and reliability of the resultant toner. The washing is preferably carried out several times.

In addition, in the drying step, any optional methods such as vibration-type fluidizing drying method, spray-drying method, freeze-drying method and flash jet method can be employed. The water content after drying the toner mother particles is preferably adjusted to 1.5% by weight or less and more preferably 1.0% by weight or less from the viewpoint of good chargeability of the resulting toner.

[Toner for Electrophotography]

The toner for electrophotography according to the present invention contains the thus obtained unified particles (toner mother particles). The content of the unified particles in the toner is preferably from 95 to 100% by weight and more preferably from 96.5 to 99% by weight from the viewpoints of good chargeability and fusing ability of the toner.

The volume-median particle size ($D_{50}$) of the toner is preferably from 1 to 10 μm, more preferably from 2 to 8 μm and even more preferably from 3 to 7 μm from the viewpoints of high image quality and productivity. From the same viewpoints, as to the particle size distribution of the toner particles, the CV value [(standard deviation of particle size distribution/volume-median particle size ($D_{50}d$)×100] of the toner is preferably 25% or less, more preferably 20% or less and even more preferably 18% or less.

In addition, the toner preferably has a softening point of from 60 to 140° C., more preferably from 60 to 130° C. and even more preferably from 60 to 120° C. from the viewpoint of good low-temperature fusing ability. Also, the toner preferably has a maximum endothermic peak temperature as measured by a differential scanning calorimeter of from 60 to 140° C., more preferably from 60 to 130° C. and even more preferably from 60 to 120° C. from the same viewpoint.

In the toner obtained by the present invention, an external additive such as a fluidizing agent can be added to treat the surface of the toner mother particles therewith. As the external additive, there may be used known fine particles. Examples of the fine particles include inorganic fine particles such as fine silica particles whose surface is subjected to a hydrophobic treatment, fine titanium oxide particles, fine alumina particles, fine cerium oxide particles, and carbon blacks; and fine polymer particles such as polycarbonates, polymethyl methacrylate and silicone resins.

The amount of the external additive formulated is preferably from 1 to 5 parts by weight and more preferably from 1.5 to 3.5 parts by weight on the basis of 100 parts by weight of the toner mother particles before being treated with the external additive. Here, when a hydrophobic silica is used as the external additive, the hydrophobic silica is preferably added in an amount of from 1 to 3 parts by weight on the basis of 100 parts by weight of the toner mother particles before being treated with the external additive.

Examples of a transfer medium (recording medium) to which the toner for electrophotography according to the present invention is applicable include ordinary papers and OHP sheets used for electrophotographic copying machines and printers. The toner image formed on the surface of the transfer medium is thermally fixed thereon, for example, using a superheating type fixing device, thereby obtaining a final toner image. As the heating type fixing device, there may be used a contact-heating type fixing device using heating rollers or a non-contact heating type fixing device being heated by an oven. Among these fixing devices, from the viewpoints of reliability, safety and heat efficiency, the use of the contact heating-type fixing device is preferred.

In accordance with the present invention, the resin emulsion suitable for production of the toner for electrophotography which is employed in electrophotography, electrostatic recording method, electrostatic printing method or the like, can be prepared with a high efficiency without using an organic solvent and a special apparatus.

The present invention is described in more detail by referring to the following examples. However, it should be noted that these examples are only illustrative and not intended to limit the invention thereto.

Various properties were measured and evaluated by the following methods.

[Acid Value of Resins]

Determined according to JIS K0070; however, with respect to only a solvent used upon the measurement, the mixed solvent of ethanol and ether as prescribed in JIS K0070 was replaced with a mixed solvent containing acetone and toluene at a volume ratio of 1:1.

[Softening Point, Maximum Endothermic Peak Temperature, Melting Point and Glass Transition Point of Resins and Toners]

(1) Softening Point

The softening point refers to a temperature at which half the amount of the sample flows out when plotting a downward movement of a plunger against temperature, as measured by using a flow tester "CFT-500D," commercially available from Shimadzu Corporation, in which 1 g of the sample is extruded through a nozzle having a die pore size of 1 mm and a length of 1 mm while heating the sample so as to raise the temperature at a rate of 6° C./min and applying a load of 1.96 MPa thereto with the plunger.

(2) Maximum Endothermic Peak Temperature and Melting Point

The maximum endothermic peak temperature of the sample is determined using a differential scanning calorimeter ("DSC 210," commercially available from Seiko Instruments, Inc.), by raising its temperature at a rate of 10° C./min, after raising the temperature of the sample to 200° C., and cooling the hot sample from this temperature to 0° C. at a cooling rate of 10° C./min. Among the endothermic peaks observed, the temperature of an endothermic peak on the highest temperature side is defined as the maximum endothermic peak temperature. When a difference between the maximum endothermic peak temperature and the softening point is within 20° C., the peak temperature is defined as the melting point. When the maximum endothermic peak temperature is equal to or lower than the temperature calculated from the softening −(minus) 20° C., the peak is ascribed to glass transition.

(3) Glass Transition Point

The glass transition point of the sample is determined using a differential scanning calorimeter ("DSC 210," commercially available from Seiko Instruments, Inc.), by raising its temperature at a rate of 10° C./min, after raising the temperature of the sample to 200° C., and cooling the sample from this temperature to 0° C. at a cooling rate of 10° C./min. When a peak is observed at a temperature equal to or lower than the temperature calculated from the softening point −(minus) 20° C., the peak temperature thereof is read off as a glass transition point, and when a shift of the curve is observed without any observations of peaks at a temperature equal to or lower than the temperature calculated from the softening point −(minus) 20° C., the temperature of an intersection of the tangential line having the maximum inclination of the curve in the portion of the curve shift and the extended baseline of the high-temperature side of the curve shift is read off as a glass transition point. The glass transition point is a property inherently owned by the amorphous portion in the resin, which may be generally observed in an amorphous polyester, or may be also observed in an amorphous portion of a crystalline polyester in some cases.

[Number-Average Molecular Weight of Resin Binder]

The number-average molecular weight is obtained from the molecular weight distribution determined by gel permeation chromatography according to the following method.

(1) Preparation of Sample Solution

The resin binder or toner is dissolved in chloroform so as to have a concentration of 0.5 g/100 mL. The resulting solution is then filtered with a fluororesin filter ("FP-200," commercially available from Sumitomo Electric Industries, Ltd.) having a pore size of 2 μm to remove insoluble components therefrom, thereby obtaining a sample solution.

(2) Determination of Molecular Weight Distribution

Using the below-mentioned analyzer, chloroform is allowed to flow at a rate of 1 mL/min, and the column is stabilized in a thermostat at 40° C. One-hundred microliters of the sample solution is injected to the column to determine the molecular weight distribution. The molecular weight of the sample is calculated on the basis of a calibration curve previously prepared. The calibration curve of the molecular weight is one prepared by using several kinds of monodisperse polystyrenes (those having a molecular weight of $2.63 \times 10^3$, $2.06 \times 10^4$ and $1.02 \times 10^5$ available from Tosoh Corporation; and those having a molecular weight of $2.10 \times 10^3$, $7.00 \times 10^3$ and $5.04 \times 10^4$ available from GL Science Co., Ltd.) as standard samples.

Analyzer: CO-8010 (commercially available from Tosoh Corporation)

Column: GMHLX+G3000HXL (commercially available from Tosoh Corporation)

[Particle Size of Dispersed Emulsified Particles and Particle Size of Unified Particles]

Using a laser diffraction particle size analyzer ("SALD-2000J" commercially available from Shimadzu Corporation), a cell for determination is charged with distilled water and a volume-median particle size ($D_{50}$) is obtained at a concentration of the dispersion so that its absorbance is within a proper range.

[Particle Size of Toner]

(1) Preparation of Dispersion

Ten milligrams of a sample to be measured is added to 5 mL of a dispersion medium (a 5% by weight aqueous solution of "EMULGEN 109P" (commercially available from Kao Corporation, polyoxyethylene lauryl ether, HLB value: 13.6)), and dispersed with an ultrasonic disperser for one minute. Thereafter, 25 mL of electrolytic solution ("Isotone II" (commercially available from Beckman Coulter)) is added thereto, and the mixture is further dispersed with the ultrasonic disperser for one minute to obtain a dispersion.

(2) Measuring Apparatus: Coulter Multisizer II (Commercially Available From Beckman Coulter)
Aperture Diameter: 100 μm
Range of Particle Sizes to Be Determined: 2 to 40 μm
Analyzing Software: Coulter Multisizer AccuComp Ver. 1.19 (commercially available from Beckman Coulter)

(3) Measurement Conditions

One-hundred milliliters of an electrolyte and a dispersion are added to a beaker, and the particle sizes of 30000 particles are determined under the conditions for concentration satisfying that the determination for 30000 particles are completed in 20 s to determine its volume-median particle size ($D_{50}$). Further, the CV value is calculated according to the following formula:

CV Value (%)=(Standard Deviation of Particle Size Distribution/Volume-Median Particle Size)×100

PRODUCTION EXAMPLE 1

Production of Polyester Resin A

Under a nitrogen atmosphere, 8320 g of polyoxypropylene (2.2)-2,2-bis(4-hydroxyphenyl)propane, 80 g of polyoxyethylene(2.0)-2,2-bis(4-hydroxyphenyl)propane, 1592 g of terephthalic acid and 32 g of dibutyl tin oxide as an esterification catalyst were reacted with each other under normal pressures at 230° C. for 5 h, and further reacted under reduced pressure. After the obtained reaction product was cooled to 210° C., 1672 g of fumaric acid and 8 g of hydroquinone were added thereto to conduct a reaction therebetween for 5 h, and further the reaction was conducted under reduced pressure, thereby obtaining a polyester resin A. The polyester resin A had a softening point of 110° C., a glass transition point of 66° C., an acid value of 24.4 mg KOH/g, and a number-average molecular weight of 3760. One kilogram of the obtained polyester resin A was passed through a sieve according to JIS Z8801 having an opening diameter of 5.6 mm. As a result, it was confirmed that no residue on the sieve remained.

PRODUCTION EXAMPLE 2

Production of Polyester Resin B

A four-neck flask equipped with a nitrogen inlet tube, a dehydration 25 tube, a stirrer, and a thermocouple was charged with 17500 g of polyoxypropylene(2.2)-2,2-bis(4-hydroxyphenyl)propane, 16250 g of polyoxyethylene(2.0)-2,2-bis(4-hydroxyphenyl)propane, 11454 g of terephthalic acid, 1608 g of dodecenyl succinic anhydride, 4800 g of trimellitic anhydride and 15 g of dibutyl tin oxide. The resulting mixture were reacted at 220° C. under a nitrogen atmosphere while stirring until the softening point determined according to ASTM D36-86 reached 120° C., thereby obtaining a polyester resin B. The polyester resin B had a softening point of 123° C., a glass transition point of 65° C., an acid value of 21.0 mg KOH/g and a number-average molecular weight of 2230. One kilogram of the obtained polyester resin B was passed through a sieve having an opening diameter of 5.6 mm in the same manner as in Production Example 1. As a result, it was confirmed that no residue on the sieve remained.

PRODUCTION EXAMPLE 3

Production of Master Batch 1

Seventy parts by weight of fine particles of the polyester resin A obtained in Production Example 1 and 30 parts by weight of a slurry pigment of copper phthalocyanine ("ECB-301"; solid content: 46.2% by weight) available from Dai-Nichi Seika Co., Ltd., were charged into a Henschel mixer, and mixed with each other for 5 min to obtain a wet mixture. The resulting mixture was charged into a kneader-type mixer and gradually heated. The resin was melted at a temperature of about 90 to 110° C., and the mixture was kneaded in the condition that water was still present therein, and further continuously kneaded at a temperature of 90 to 110° C. for 20 min while evaporating water therefrom.

The resulting kneaded material was continuously kneaded at 120° C. to evaporate residual water therefrom, and dehydrated and dried, and further continuously kneaded at a temperature of 120 to 130° C. for 10 min. After cooling, the obtained kneaded material was further kneaded with a heating three-roll mill, cooled and coarsely crushed, thereby obtaining a high-concentration colored composition in the form of coarse particles containing 30% by weight of a blue pigment (master batch 1). The resulting composition was placed on a slide glass, and heat-melted. As a result of observing the melted composition using a microscope, it was confirmed that the pigment particles were entirely finely dispersed in the composition, and no coarse particles were present therein. One kilogram of the obtained master batch 1 was passed through a sieve having an opening diameter of 5.6 mm in the same manner as in Production Example 1. As a result, it was confirmed that no residue on the sieve remained.

EXAMPLE 1

Production of Resin Emulsion 1

A mixed resin composed of 319.9 g of the polyester resin A, 210.0 g of the polyester resin B and 100.2 g of the master batch 1 (the mixed resin obtained by mixing and melting the polyester resin A, the polyester resin B and the resin contained in master batch 1 at such a mixing ratio had a softening point of 114° C. and a glass transition point of 64° C.), 9.23 g of an anionic surfactant "NEOPELEX G-65" (sodium dodecylbenzenesulfonate; solid content: 65% by weight) available from Kao Corporation, 3.0 g of a nonionic surfactant "LEODOL AS-10" (sorbitan monostearate; melting point: 60° C.; HLB: 4.7) available from Kao Corporation, 6.0 g of a nonionic surfactant "EMULGEN 430" (polyoxyethylene (26 mol) oleyl ether; HLB: 16.2) available from Kao Corporation and 278.5 g of a 5 wt % potassium hydroxide aqueous solution, were dispersed at 25° C. in a 2 liter-stainless steel pot while stirring with a paddle-shaped stirrer at a rate of 200 r/min. The contents of the pot were stabilized at 96° C. and then allowed to stand for 2 h while stirring with a paddle-shaped stirrer at a rate of 200 r/min (degree of neutralization: 100%). Subsequently, deionized water was added dropwise to the mixture at a rate of 6 g/min while stirring with the paddle-shaped stirrer at a rate of 200 r/min, totaling to an amount of 1735.4 g. During the addition, the viscosity of the system reached a maximal value at the time at which 300 g of the deionized water was added thereto, and the temperature of the system was kept at 96°C. After cooling, the reaction mixture was passed through a wire mesh having a 200 mesh screen (opening: 105 μm) to obtain a resin emulsion 1 containing fine resin particles. The resin particles in the resulting resin emulsion 1 had a volume-median particle size of 0.56 μm and a solid content of 24.7% by weight. No resin components remained on the wire mesh.

The mixing ratios of the respective components and the results are shown in Table 1.

EXAMPLES 2 TO 7

Production of Resin Emulsions 2 to 7

The same procedure as in Example 1 was repeated except that the mixing ratios were varied as shown in Table 1, thereby preparing resin emulsions 2 to 7. The results are shown in Table 1.

COMPARATIVE EXAMPLE 1

A mixed resin composed of 160.0 g of the polyester resin A, 105.0 g of the polyester resin B and 50.1 g of the master batch 1, 12.0 g of an anionic surfactant "NEOPELEX G-65" (sodium dodecylbenzenesulfonate; solid content: 25% by weight) available from Kao Corporation, 3.0 g of a nonionic surfactant "EMULGEN 430" (polyoxyethylene (26 mol) oleyl ether; HLB: 16.2) available from Kao Corporation and 139.2 g of a 5 wt % potassium hydroxide aqueous solution, were dispersed at 25° C. in a 2 liter-stainless steel pot while stirring with a paddle-shaped stirrer at a rate of 200 r/min. Immediately after the contents of the pot were heated to 96° C., deionized water was added dropwise to the mixture at a rate of 6 mL/min while stirring with the paddle-shaped stirrer at a rate of 200 r/min, totaling to an amount of 545.8 g. During the addition, the temperature of the system was kept at 96° C. After cooling, the reaction mixture was passed through a wire mesh having a 200 mesh screen (opening: 105 μm) to obtain a resin emulsion containing fine resin particles. Substantially all of the resin components remained on the wire mesh.

The mixing ratios of the respective components and the results are shown in Table 1.

COMPARATIVE EXAMPLE 2

A mixed resin composed of 160.0 g of the polyester resin A, 105.0 g of the polyester resin B and 50.1 g of the master batch 1 was melted at 130° C. in a 2 liter-stainless steel pot while stirring with a paddle-shaped stirrer at a rate of 200 r/min. Then, 12.0 g of an anionic surfactant "NEOPELEX G-65" (sodium dodecylbenzenesulfonate; solid content: 25% by weight) available from Kao Corporation, 3.0 g of a nonionic surfactant "EMULGEN 430" (polyoxyethylene (26 mol) oleyl ether; HLB: 16.2) available from Kao Corporation and 139.2 g of a 5 wt % potassium hydroxide aqueous solution, were added to the mixture while stirring with a paddle-shaped stirrer at a rate of 200 r/min. At the time at which the temperature of the contents in the pot reached 105° C., the stirring became impossible, and therefore the preparation of emulsified particles was interrupted.

The mixing ratios of the respective components and the results are shown in Table 1.

TABLE 1

|  | Examples | | | | | | | Comparative Examples | |
| --- | --- | --- | --- | --- | --- | --- | --- | --- | --- |
|  | 1 | 2 | 3 | 4 | 5 | 6 | 7 | 1 | 2 |
| Polyester resin A | 53.3 | 53.3 | 53.3 | 53.3 | 53.3 | 53.3 | 53.3 | 53.3 | 53.3 |
| Polyester resin B | 35.0 | 35.0 | 35.0 | 35.0 | 35.0 | 35.0 | 35.0 | 35.0 | 35.0 |
| Master batch 1 | 16.7 | 16.7 | 16.7 | 16.7 | 16.7 | 16.7 | 16.7 | 16.7 | 16.7 |
| 50 wt % potassium hydroxide aqueous solution | 46.4 | 46.4 | 46.4 | 46.4 | 46.4 | 46.4 | 46.4 | 46.4 | 46.4 |
| Sodium dodecybenzene-sulfonate | 1 | 1 | 1 | 1 | 1 | 2 | 1 | 1 | 1 |
| Polyoxyethylene oleyl ether (EO: 26 mol added) | 1 | 1 | — | — | 0.5 | — | — | 1 | 1 |
| Sorbitan monostearate | 0.5 | — | — | 2 | 2 | — | 0.5 | — | — |
| Stirring time for neutralization (h)*) | 2.2 | 2.2 | 2.2 | 2.2 | 2.2 | 2.2 | 2.2 | 0.2 | 0 |
| Resin content immediately before initiation of emulsification (wt %) | 52 | 55 | 55 | 52 | 53 | 57 | 53 | — | — |
| Volume-median particle size of emulsified particles (μm) | 0.56 | 0.44 | 0.53 | 0.51 | 0.50 | 0.46 | 0.45 | Not emulsifiable | |
| Solid content of resin emulsion (wt %) | 24.7 | 25.1 | 23.6 | 24.3 | 24.7 | 24.7 | 30.7 | — | — |

Note:
*)Time for which the resin dispersion prepared in the step (a) was stirred at a temperature not lower than the glass transition point of the resin and not higher than the softening point of the resin Meanwhile, in the above Table 1, the numerals for the respective components represent "part(s) by weight" thereof calculated on the basis of 100 parts by weight of a total resin component of the polyester resin A, the polyester resin B and the resin contained in the master batch 1.

EXAMPLE 8

Production of Toner (1) Preparation of Aggregated Particles

Five hundred grams of the resin emulsion obtained in Example 1 and 73 g of deionized water were charged into a 1-liter container, and then 233 g of a 1 wt % sulfuric acid aqueous solution was added thereto at 60° C. while stirring with a paddle-shaped stirrer at a rate of 100 r/min. After 1 min, 3.2 g of 25 wt % aqueous ammonia and then 168 g of a 10 wt % sodium sulfate aqueous solution as an aggregating agent were added to the container, and the resulting mixture was stirred at 60° C. for 3 min. Thereafter, the obtained mixture was heated from 60° C. at a temperature rise rate of 0.16° C./min while stirring.

(2) Preparation of Unified Particles

At the time at which the temperature of the dispersion reached 85° C., the heating was stopped. While stirring, the dispersion was slowly cooled to room temperature (preparation of unified particles). Subsequently, the contents of the container were subjected to a suction filtration step, a washing step and a drying step to obtain fine colored resin particles. The fine colored resin particles had a volume-median particle size ($D_{50}$0 of 4.5 μm.

(3) Preparation of Toner

A hydrophobic silica ("R972" commercially available from Nippon Aerogel Co., Ltd.; number-average particle size: 16 nm) was externally added in an amount of 1.0 part by weight on the basis of 100 parts by weight of the fine colored resin particles using a Henschel mixer to obtain a cyan toner. The resulting cyan toner had a volume-median particle size ($D_{50}$) of 4.0 μm, a CV value of 23%, a softening point of 90.2° C. and a glass transition point of 54.1° C. Various properties of the resulting toner are shown in Table 2.

A silicone-coated ferrite carrier (commercially available from Kanto Denka Kogyo Co., Ltd.) having an average particle size of 60 μm was added to the resulting cyan toner to prepare a developer having a weight ratio of the toner to a sum of the toner and the carrier (weight of tone/total weight of toner and carrier T/D=5.0% by weight). The thus prepared developer was loaded to a copying machine "IPSIO NX85S" available from Ricoh Corporation to form solid printed images. The resulting solid printed images were subjected to a fixing test at intervals of 10° C. in a temperature range of from 100° C. to 200° C. using a silicone oil-coating type fixing device. As a result, it was confirmed that the solid printed images were fixable at 120° C.

[Fixing Test for Toner]

After measuring the image density of the solid images fixed on a paper at the respective temperatures using a transmission type densitometer "Macbeth TR-927", the printed paper was set onto a rubbing tester equipped with a metal blade. A blank paper of the same type as that of the printed paper was wound over a surface of the printed paper, and a portion of the blank paper corresponding to the solid images on the printed paper was rubbed with the metal blade by 10 strokes by applying a load of 1 kg to the metal blade. After the rubbing, the image density of the solid images on the printed paper was measured again to calculate a residual percentage of images upon rubbing according to the following formula:

Residual percentage upon rubbing (%)=(image density after rubbing/image density before rubbing)×100

The low-temperature fusing ability of the toner was evaluated from a minimum fixing temperature determined as a temperature of a fixing roll at which the residual percentage of images upon rubbing exceeds 90%.

EXAMPLE 9

Preparation of Toner (1) Preparation of Aggregated Particles

Five hundred grams of the dispersion containing the resin-containing particles obtained in Example 2 and 86 g of deionized water were charged into a 1-liter container, and then 238 g of a 1 wt % sulfuric acid aqueous solution was added thereto at 60° C. while stirring with a paddle-shaped stirrer at a rate of 100 r/min. After 1 min, 3.3 g of 25 wt % aqueous ammonia and then 172 g of a 10 wt % sodium sulfate aqueous solution as an aggregating agent were added to the container, and the resulting mixture was stirred at 60° C. for 3 min. Thereafter, the obtained mixture was heated from 60° C. at a temperature rise rate of 0.16° C./min while stirring.

(2) Preparation of Unified Particles

At the time at which the temperature of the dispersion reached 87° C., the heating was stopped. While stirring, the dispersion was cooled to room temperature (preparation of unified particles). Subsequently, the contents of the container were subjected to a suction filtration step, a washing step and a drying step to obtain fine colored resin particles. The fine colored resin particles had a volume-median particle size ($D_{50}$) of 5.0 μm.

(3) Preparation of Toner

A hydrophobic silica ("R972" commercially available from Nippon Aerogel Co., Ltd.; number-average particle size: 16 nm) was externally added in an amount of 1.0 part by weight on the basis of 100 parts by weight of the fine colored resin particles using a Henschel mixer to obtain a cyan toner. The resulting cyan toner had a volume-median particle size ($D_{50}$) of 3.7 μm, a CV value of 20%, a softening point of 89.8° C. and a glass transition point of 55.5° C. Various properties of the resulting toner are shown in Table 2.

A silicone-coated ferrite carrier (commercially available from Kanto Denka Kogyo Co., Ltd.) having an average particle size of 60 μm was added to the resulting cyan toner to prepare a developer having a T/D ratio of 5.0% by weight. The thus prepared developer was loaded to a copying machine "IPSIO NX85S" available from Ricoh Corporation to form solid printed images. The resulting solid printed images were subjected to a fixing test at intervals of 10° C. in a temperature range of from 100° C. to 200° C. using a silicone oil-coating type fixing device in the same manner as in Example 8. As a result, it was confirmed that the solid printed images were fixable at 120° C.

EXAMPLE 10

Production of Toner (1) Preparation of Aggregated Particles

Five hundred grams of the resin emulsion obtained in Example 3 and 57 g of deionized water were charged into a 1-liter container, and then 226 g of a 1 wt % sulfuric acid aqueous solution was added thereto at 60° C. while stirring with a paddle-shaped stirrer at a rate of 100 r/min. After 1 min, 3.1 g of 25 wt % aqueous ammonia and then 16.4 g of a 10 wt % sodium sulfate aqueous solution as an aggregating agent were added to the container, and the resulting mixture was stirred at 60° C. for 3 min. Thereafter, the obtained mixture was heated from 60° C. at a temperature rise rate of 0.16° C./min while stirring.

(2) Preparation of Unified Particles

At the time at which the temperature of the dispersion reached 95° C., the heating was stopped. While stirring, the dispersion was cooled to room temperature (preparation of unified particles). Subsequently, the contents of the container were subjected to a suction filtration step, a washing step and a drying step to obtain fine colored resin particles. The fine colored resin particles had a volume-median particle size ($D_{50}$) of 4.0 μm.

(3) Preparation of Toner

A hydrophobic silica ("R972" commercially available from Nippon Aerogel Co., Ltd.; number-average particle size: 16 nm) was externally added in an amount of 1.0 part by weight on the basis of 100 parts by weight of the fine colored resin particles using a Henschel mixer to obtain a cyan toner. The resulting cyan toner had a volume-median particle size ($D_{50}$) of 3.8 μm, a CV value of 16%, a softening point of 102° C. and a glass transition point of 59.2° C. Various properties of the resulting toner are shown in Table 2.

A silicone-coated ferrite carrier (commercially available from Kanto Denka Kogyo Co., Ltd.) having an average particle size of 60 μm was added to the resulting cyan toner to prepare a developer having a T/D ratio of 5.0% by weight. The thus prepared developer was loaded to a copying machine "IPSIO NX85S" available from Ricoh Corporation to form solid printed images. The resulting solid printed images were subjected to a fixing test at intervals of 10° C. in a temperature range of from 100° C. to 200° C. using a silicone oil-coating type fixing device in the same manner as in Example 8. As a result, it was confirmed that the solid printed images were fixable at 120° C.

TABLE 2

| | Examples | | |
|---|---|---|---|
| Toner particles | 8 | 9 | 10 |
| Kind of resin emulsion | Emulsion 1 | Emulsion 2 | Emulsion 3 |
| Volume-median particle size (μm) | 4.0 | 3.7 | 3.8 |
| CV value (%) | 23 | 20 | 16 |
| Softening point (° C.) | 90.2 | 89.8 | 102 |
| Glass transition point (° C.) | 54.1 | 55.5 | 59.2 |

What is claimed is:

1. A process for producing a resin emulsion, comprising:
   (a) dispersing a resin containing acidic group in a basic aqueous medium substantially free of organic solvent at a temperature lower than a softening point of the resin;
   (b) neutralizing a dispersion obtained in the step (a) at a temperature not lower than a glass transition point of the resin and not higher than the softening point of the resin; and
   (c) adding an aqueous liquid to the dispersion neutralized in the step (b) at the temperature not lower than the glass transition point of the resin and not higher than the softening point of the resin to emulsify the resin in the aqueous medium.

2. The process according to claim 1, wherein the resin containing acidic group used in the step (a) has a particle size capable of allowing 95% by weight or more of the resin to pass through a sieve having an opening diameter of 5.6 mm.

3. The process according to claim 1, wherein a content of the resin in the dispersion immediately before initiation of the emulsification in the step (c) is from 50 to 90% by weight.

4. The process according to claim 1, wherein in the step (c), the aqueous liquid is added to the dispersion at a rate of 0.5 to 50 g/min per 100 g of the resin.

5. The process according to claim 1, wherein the resin containing acidic group has an acid value of 10 to 50 mg KOH/g.

6. The process according to claim 1, wherein the resin containing acidic group comprises a polyester.

7. The process according to claim 1, wherein in the step (a), a surfactant is present in an amount of 0.2 to 5% by weight on the basis of the weight of the resin containing acidic group.

8. The process according to claim 1, wherein emulsified particles of the resin obtained in the step (c) have a volume-median particle size of 0.02 to 2 μm.

9. The process according to claim 1, wherein the resin containing acidic group is a polyester resin having a carboxyl group bonded to a terminal end thereof.

10. The process according to claim 9, wherein said polyester resin is obtained from an alkyleneoxide adduct of bisphenol A represented by the following formula (I):

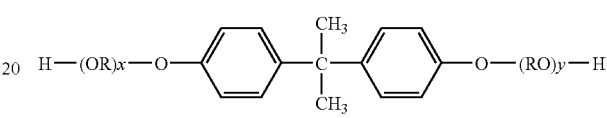

wherein R is an alkylene group having 2 or 3 carbon atoms; and x and y are respectively a positive number with the proviso that a sum of x and y is from 1 to 16.

11. The process according to claim 9, wherein said polyester resin comprises two polyester resins.

12. The process according to claim 9, wherein the resin containing acidic group has an acid value of 15 to 30 mg KOH/g.

13. The process according to claim 1, wherein the resin containing acidic group comprises an amorphous polyester which has at least one of a softening point of 95 to 160° C., a glass transition point of 50 to 75° C., an acid value of 1 to 40 mg KOH/g, and a hydroxyl value of 3 to 60 mg KOH/g.

14. The process according to claim 1, wherein the temperature of step (a) is from 10 to 50° C. lower than the softening point.

15. The process according to claim 1, wherein step (b) is carried out by stirring for 30 minutes or longer.

16. The process according to claim 1, wherein step (b) is carried out by stirring for one hour or longer.

17. The process according to claim 1, wherein the temperature of step (b) is not lower than 10° C. higher than the glass transition point and not higher than 5° C. below the softening point.

18. The process according to claim 1, wherein the basic aqueous medium contains no organic solvent.

19. A process for preparing a toner for electrophotography comprising producing a resin emulsion by the process according to claim 1; and aggregating and coalescing the emulsified particles contained in the thus produced resin emulsion in the presence of a colorant.

20. The process according to claim 19, wherein said aggregating and coalescing are carried out simultaneously by heating to a temperature at which the particles can be both aggregated and unified, and then continuously stirring the particles at that temperature.

* * * * *